(12) United States Patent
Nolte et al.

(10) Patent No.: US 7,641,972 B2
(45) Date of Patent: Jan. 5, 2010

(54) SURFACE-MODIFIED NANOPARTICLES COMPRISING POLYSILOXANE MODIFIER, THEIR PREPARATION AND USE

(75) Inventors: Ulrich Nolte, Kleve (DE); Alfred Bubat, Wesel (DE); Karlheinz Haubennestel, Wesel (DE); Thomas Sawitowski, Essen (DE)

(73) Assignee: BYK-Chemie GmbH (DE)

( * ) Notice: Subject to any disclaimer, the term of this patent is extended or adjusted under 35 U.S.C. 154(b) by 689 days.

(21) Appl. No.: 11/354,338

(22) Filed: Feb. 14, 2006

(65) Prior Publication Data

US 2006/0204528 A1 Sep. 14, 2006

(30) Foreign Application Priority Data

Feb. 14, 2005 (DE) .................. 10 2005 006 870

(51) Int. Cl.
*B32B 5/16* (2006.01)
*B05D 7/00* (2006.01)

(52) U.S. Cl. .................. 428/403; 427/212; 427/215; 427/220; 428/405; 428/447

(58) Field of Classification Search .......... 428/403, 428/404, 407, 405; 427/212, 215, 220
See application file for complete search history.

(56) References Cited

U.S. PATENT DOCUMENTS 5,378,521 A * 1/1995 Ogawa et al. ............. 428/85
5,686,054 A 11/1997 Barthel et al.
5,851,715 A 12/1998 Barthel et al.
5,919,487 A * 7/1999 Simonnet et al. .......... 424/490
6,008,285 A 12/1999 Kasemann et al.
6,120,778 A * 9/2000 Simonnet ................... 424/401
6,228,921 B1 5/2001 Kasemann et al.
6,645,569 B2 * 11/2003 Cramer et al. ............. 427/466
6,887,518 B2 5/2005 Barthel et al.
7,153,573 B2 * 12/2006 Tsuji et al. ................. 428/403
7,255,735 B2 * 8/2007 Meyer et al. ............... 106/445
2005/0170192 A1 * 8/2005 Kambe et al. .............. 428/447
2007/0185261 A1 * 8/2007 Lee et al. ................... 524/588

FOREIGN PATENT DOCUMENTS

| DE | 4338361 A1 | 5/1995 |
|---|---|---|
| DE | 19540623 A1 | 5/1997 |
| DE | 69721923 T2 | 5/2004 |
| EP | 0686676 A1 | 12/1995 |
| EP | 0687657 A1 | 12/1995 |
| EP | 1304361 A1 | 4/2003 |

* cited by examiner

*Primary Examiner*—H. (Holly) T Le
(74) *Attorney, Agent, or Firm*—Schwegman, Lundberg & Woessner, P.A.

(57) ABSTRACT

The invention relates to surface-modified nanoparticles composed of metal or semimetal oxides or hydroxides and having been reacted on their surface with a modifier, with formation of covalent bonds. The modifier is a polysiloxane. The invention also relates to a process for preparing the nanoparticles, to their use as fillers in coating materials, plastics, foams and nail varnishes, and to dispersions which comprise the nanoparticles.

11 Claims, No Drawings

SURFACE-MODIFIED NANOPARTICLES COMPRISING POLYSILOXANE MODIFIER, THEIR PREPARATION AND USE

RELATED APPLICATION

This application claims priority under 35 U.S.C. 119 to German Application No. DE 10 2005 006 870.7, filed Feb. 14, 2005, which application is incorporated herein by reference and made a part hereof.

The present invention relates to surface-modified nanoparticles composed of metal or semimetal oxides or hydroxides and having been reacted on their surface with a modifier, with formation of covalent bonds. The present invention further relates to new dispersions of the surface-modified nanoparticles in carrier media. The present invention further relates to a process for preparing the surface-modified nanoparticles. The present invention likewise relates to the use of the new surface-modified nanoparticles as fillers in coating materials, plastics, foams and nail varnishes.

PRIOR ART

Nanoparticles are finely divided solids having a particle size of 2 to 200 nm. For the purposes of the present invention the particle sizes were determined by means of transmission electron microscopy (TEM). To determine the particle size of the nanoparticles of the invention a TEM analysis was carried out. The nanoparticle dispersions in question were diluted, applied to a carbon grid (600 mesh carbon film) and dried. Analysis was carried out in each case using a LEO 912 transmission electron microscope. The TEM images were evaluated digitally using software from analySIS Soft Imaging System GmbH. The particle diameter was calculated for at least 1000 particles in each case, by correlating the measured area of the nanoparticles with a circle of equal area. The results were then added averaged.

The use of nanoparticles as fillers for coating systems offers the advantage of giving a coating material desired properties (such as increased scratch resistance, for example) without having at the same time to accept negative side-effects (such as inadequate transparency, for example).

It is known that the incorporation of nanoparticles into coating materials leads to an improvement in the mechanical properties of coating systems, particularly of UV-curable coating systems.

For example, patent application EP 1236765 A1 describes a process for modifying nanoscale silica particles with alkoxysilanes, which following incorporation into the corresponding UV-curable coating system produce an improvement in the mechanical properties. In other highly crosslinked systems, such as in epoxy resins, positive effects are likewise found. The improvement in mechanical properties can be explained substantially by the binding of the nanoparticles to the surrounding matrix via chemical bonds. Owing to the chemical attachment of the particles to the organic matrix, increasing embrittlement is observed, depending on the level of filling of the coating materials with such nanoparticles, and in some fields of application of the coating such embrittlement cannot be tolerated. If the known, silica-based nanoscale fillers are not attached to the organic matrix, the effect of improvement in the mechanical properties is far less pronounced in UV-curable and epoxy-based coating systems.

Besides silica nanoparticles, other kinds of nanoparticles as well can be incorporated into coating materials in order to optimize mechanical properties. For example, by adding nanoscale alumina (e.g.: NANOBYK-3600 or NANOBYK-3601; BYK-Chemiei GmbH, Wesel, Del.) to UV-curable coating systems a substantial improvement is obtained in abrasion resistance, without effecting the flexibility of the system. In this case the alumina is not attached to the organic matrix of the coating system. Within the coating matrix the nanoparticles are stabilized by means of commercially customary wetting and dispersing additives.

Coating systems which are not radiation-curing or based on epoxy systems can also be optimized in terms of their scratch resistance by addition of nanoparticles.

U.S. Pat. No. 6,593,417 describes a process whereby silica particles are used in combination with a polysiloxane in a 2-component polyurethane coating material.

The polysiloxane possesses reactive groups which are able to attach to the coating matrix via covalent groups. Attachment of the polysiloxane to the nanoparticles is only via coordinative interactions. The specific combination of nanoparticles and polysiloxane results in the nanoparticles undergoing orientation to the coating/air interface, where they result in a mechanical reinforcement which is manifested in enhanced scratch resistance. A disadvantage is the orientation of the nanoparticles to the coating/air interface: stress on the coating, through the effects of weathering and wear, remove the topmost layer first of all, and hence the activity subsides in the course of time.

U.S. Pat. No. 5,853,809 teaches the possibility of improving the scratch resistance of coating systems such as are used, for example, in automotive topcoats through the incorporation of modified nanoparticles. The nanoparticles are modified, for example, by a functional polyurethane such that the polymer enters into a covalent bond with the surface of the nanoparticle. Moreover, the polymeric shell of the nanoparticle thus modified is able to enter into covalent bonds with the binder system of the coating material. No mention is made of the embrittlement of the coating system, particularly when the amounts of nanoparticles present are high.

Although these known modified nanoparticles do improve the scratch resistance of the coating materials in which they are used, the attachment of the nanoparticles via modification to the coating matrix is objectionable, particularly in the case of non-radiation-curing systems. Attachment of the nanoparticles to the coating matrix raises the network density of the cured coating film, leading to increased brittleness of the film.

Patent application DE 195 40 623 A1 discloses nanoscale filler particles dispersed in a polymeric matrix. The surface modifiers described include silanes, especially organoalkoxysilanes. The surface modifier is a low molecular weight compound having a molecular weight of not more than 500. The functional groups such compounds are required to carry are guided by the surface groups of the nanoscale particles and by the desired interaction with the matrix. In other words, the modified particles have an affinity for the matrix.

PROBLEM ADDRESSED BY THE INVENTION

The object on which the present invention was based was to provide a new surface modification of nanoparticles and to provide the nanoparticles as a stable dispersion in solvents or other carrier media of the kind used in the coatings industry. Even when containing a high level of particles, the new dispersions ought to possess high storage stability. The propensity of the nanoparticle dispersion towards sedimentation and/or gelling ought to be ruled out. Moreover, the dispersion, if used to prepare coating materials, ought to produce an increase in the scratch resistance of the cured coatings. The reactivity of the new surface-modified nanoparticles with respect to the binder components of the coating system employed ought to be minimized, in order to avoid the tendency towards embrittlement of the cured coating film.

A further object of the invention was to provide a process which is easy to implement and can be varied widely in order thus to provide new surface-modified nanoparticles and their dispersions for different end-use applications, in a tailored form.

SOLUTION

Surprisingly it has been found that the aforementioned objects are achieved by means of nanoparticles which carry on their surface covalently bonded modifiers which have a relatively high molecular weight, are preferably of linear construction and are inert towards a surrounding matrix.

The present invention accordingly provides surface-modified nanoparticles of the type specified at the outset which are characterized in that the modifier is a polysiloxane of the following general empirical formula:

$$(R^1_x R^2_{3-x} SiR^3)_y R^5$$

in which
x=0-2, in particular 0
y=1-10, preferably 2-5
$R^1$=monovalent organic radical having 1-18 carbon atoms, in particular 1-3 carbon atoms
$R^2$=OH group or hydrolyzable group consisting of:
  linear or branched or cyclic alkoxy group having 1-6 carbon atoms, in particular having 1-2 carbon atoms
  a halogen atom, in particular a chlorine atom, or
  a carboxylic acid radical having 14 carbon atoms, preferably 2 carbon atoms
$R^3$=oxygen or divalent organic radical consisting of:
  preferably linear or branched alkylene radical having 1-8 carbon atoms
  alkylene ether
  alkylene thioether
  alkylene polyether, preferably based on ethylene oxide, propylene oxide or butylene oxide or mixtures of the oxides
  arylene polyether
  alkylene polyester or
  an organic aliphatic or aromatic or araliphatic group which in addition to ester and/or ether groups also contain urethane and/or urea groups
$R^5$=polyvalent organic radical consisting of:
  polydialkylsiloxane having a number-average molecular weight of 300-5000 daltons, the alkyl substituents on the silicon atom having 1-8 carbon atoms.

Advantageous embodiments of the invention are apparent from the dependent and co-independent claims.

The claimed nanoparticles are therefore particles composed of a metal or semimetal oxide or hydroxide, and particles composed of mixed metal and/or semimetal oxides and/or hydroxides. Use may be made for example of the oxides of aluminium, silicon, zinc, titanium, etc., for the preparation of modified nanoparticles. Additionally it is possible to modify oxide hydroxides such as, for example, aluminium oxide hydroxide by the process indicated. The operation of preparing the oxidic or hydroxidic or oxide-hydroxidic nanoparticles can take place via any of a very wide variety of processes, such as ion exchange operations, plasma operations, sol-gel processes, precipitation, comminution (by grinding, for example) or flame hydrolysis, etc. The size of the nanoparticles is in the 2-200 nm range, preferably below 100 nm, more preferably below 50 nm. The process by which the oxidic or hydroxidic particles have been prepared is unimportant.

The innovative nanoparticles that have been found are referred to below as "nanoparticles of the invention". The new dispersions of the nanoparticles of the invention are referred to below as "dispersions of the invention".

THE ADVANTAGES OF THE SOLUTION PROVIDED BY THE INVENTION

In the light of the prior art it was surprising and unforeseeable for the skilled worker that the object on which the present invention was based could be achieved by means of the nanoparticles of the invention, the dispersions of the invention and the preparation of the invention.

The preparation of the nanoparticles of the invention and of the dispersions of the invention was easy to carry out without the use of costly and inconvenient methods or processes.

The nanoparticles of the invention were suitable in the preparation of thermally curable, radiation-curing and 2-component coating systems, thermoplastics, foams, etc.

Through the provision of the dispersion of the invention, success has been achieved in providing an easy-to-handle nanoparticle concentrate which can easily be metered, for example, into a very wide variety of coating systems in order to achieve the desired effect of improved mechanical stability, e.g. scratch resistance.

As well the easy metering of the dispersion of the invention, effective stability of the dispersion towards sedimentation and gelling has been found, particularly at high solids contents.

DETAILED DESCRIPTION OF THE INVENTION

The nanoparticles of the invention are covered with modifying groups in such a way that any functional reactive groups still present on the particle surface are shielded such that, for steric reasons, reaction of these groups with other functional groups no longer takes place.

The surface of the nanoparticles of the invention is covered with at least one kind of modifying groups. The structure of the modifying groups is illustrated below:

The modifying group is attached covalently to the particle surface. The modifying group possesses 1-10 structural elements which with the particle surface are able to build at least one covalent bond in each case. In addition the modifying group is composed of a spacer component which is unable to enter into reactions with the particle surface and is also inert towards the matrix (other coatings constituents, plastics constituents, etc.). The spacer component of the modifying group is formed from a polymer having a number-average molecular weight in the range from 300 to 5000 daltons. The structure of the spacer radical is preferably linear.

The modifier is, accordingly, constructed from at least one, or two or more, anchor groups, which are reactive towards the particle surface, and also of a poly-dialkylsiloxane. The anchor groups with the linking structures can be mounted on the ends of the polydialkylsiloxane and can also be present as a side group on the polydialkylsiloxane. The following depiction illustrates the possible structures of the modifier:

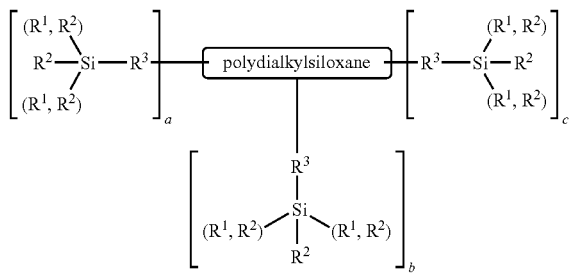

The definition of the indices is as follows:
a=0-1
b=0-1
c=0-10
a+b+c≧1

The structure of the modifier of one preferred embodiment can also be described by way of the above scheme. In this case the indices have the following values: a=1 and b=c=0. This structure of modifier possesses the best activity in application and is therefore preferred. In this case the nanoparticles of the invention are characterized in that the modifier is a polysiloxane of the general empirical formula $$R^1_x R^2_{3-x} Si—R^3—R^4$$

in which $R^4$ is a monovalent organic radical composed of a polydialkylsiloxane having a number-average molecular weight of 300-5000 daltons, the alkyl substituents on the silicon atom having 1-8 carbon atoms. These remarks can be illustrated as follows:

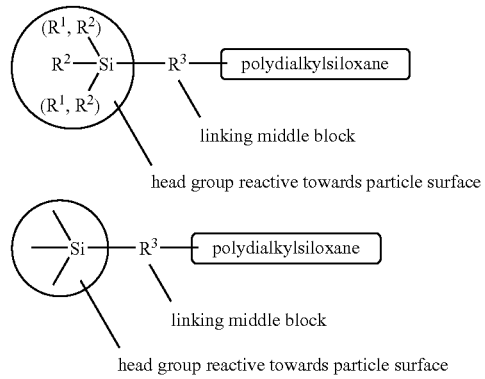

The linear molecular structure of the modifier is particularly advantageous. In other words, the modifier is composed of a head group, which is reactive towards the particle surface, of a linking middle block ($R^3$) and of a polydialkylsiloxane ($R^4$) end group.

In the case of this preferred embodiment as well the modifying group is attached to the particle surface via at least one, preferably two and more, preferably via three covalent bonds. The modifying group also is composed of a spacer component which is unable to undergo reactions with the particle surface and is likewise inert towards the matrix (other coatings constituents, plastics constituents, etc.). The spacer component of the modifying group is formed from a polymer having a number-average molecular weight in the range from 300 to 5000 daltons. The structure of the spacer radical is preferably linear.

In addition to the modification of the particles with groups as described above, there may be further modification with groups which are attached via at least one covalent bond to the particle surface and which possess one or more spacer components.

By way of example it is possible here to use alkyl-bearing functional silanes of the general empirical formula:

$$R^7_{(4-x)} SiR^6_x$$

in which the indices and variables have the following definitions:
x=1-3
$R^6$=monovalent organic radical having 1-18 carbon atoms, preferably 1-6 carbon atoms, more preferably 1-3 carbon atoms
$R^7$=hydroxyl group or hydrolyzable group consisting of:
   linear or branched or cyclic alkoxy group having 1-6 carbon atoms, in particular having 1-2 carbon atoms
   a halogen atom, especially chlorine atom, or
   a carboxylic acid radical having 1-4 carbon atoms, preferably 2 carbon atoms.

An additional or alternative possibility is that of further modification of the particle surface with ether and/or ester groups. For this purpose it is possible to use silanes of the following general empirical formula:

$$R^8_{(4-x)} Si(R^9—R^{10}—R^{11})_x$$

in which the indices and variables have the following definitions:
x=1-3
$R^8$=hydroxyl group or hydrolyzable group composed of:
   linear or branched or cyclic alkoxy group having 1-6 carbon atoms, in particular having 1-2 carbon atoms
   a halogen atom, especially chlorine atom, or
   a carboxylic acid radical having 1-4 carbon atoms, preferably 2 carbon atoms
$R^9$=oxygen or divalent organic group, e.g. alkylene radical
$R^{10}$=divalent organic radical having a molar mass in the range 130-5000 daltons, composed of a
   polyether group consisting preferably of
      ethylene oxide
      propylene oxide
      butylene oxide
      mixtures of the oxides
   aliphatic and/or cycloaliphatic and/or aromatic polyester group containing at least three

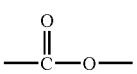

and/or

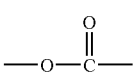

groups,
$R^{11}$=-alkyl
   -acetoxy
   —O—$R^{12}$, $R^{12}$ being an alkyl group having 1-18 carbon atoms, —O—CO—NH—R$^{13}$, R$^{13}$ being an alkyl group having 1-18 carbon atoms.

The nanoparticles of the invention can be prepared simply by mixing the modifier with a nanoparticulate powder. In this case it should be ensured that covalent attachment of the modifier to the surface of the nanoparticles takes place. The conditions for this depend on the reactivity of the functional groups to be reacted with one another, and can be determined easily by the skilled worker. If reaction does not already take place at room temperature, a covalent attachment of the modifier can be achieved by, for example, heating the mixture of nanoparticulate powder and modifier at a temperature of approximately 80° C. for a time of approximately one hour.

The nanoparticles of the invention can be employed directly in coatings and plastics. In particular, however, the nanoparticles of the invention are especially suitable for preparing dispersions in, for example, water, solvents, plasticizers, waxes, mineral oils and reactive diluents and other carrier media of the kind commonly employed in the coatings and plastics industries.

The dispersions of the invention are prepared by incorporating appropriately modified nanoparticles into the desired dispersion medium, using customary dispersing equipment, such as toothed colloid mills, dissolvers, ultrasound dispersers, etc.

Adding the modifier to a nanoparticle dispersion produces a dispersion of the invention. In the case of this process it must likewise be ensured that covalent attachment of the modifier to the nanoparticle surface takes place. Conversion of a dispersion of the invention from one dispersion medium to another dispersion medium is accomplished, for example, by means of distillation. Through the use of suitable entrainers, which form a low-boiling azeotrope with the dispersing medium that is to be removed, processes of this kind can be optimized with ease.

The amount of particles in the dispersions of the invention, measured as the residue on ignition, can be increased to levels of up to more than 40% without gelling or significant sedimentation.

The dispersions of the invention may comprise at least one additional substance coming from the area of typical coatings additives, binders or crosslinking agents. Examples that may be mentioned here include wetting and dispersing additives and additives for controlling the rheological properties, and also defoamers, light stabilizers and catalysts.

The possible applications of the nanoparticles of the invention and of the dispersions of the invention are extremely broad. Their broad usefulness, in combination with the extraordinarily high activity of the nanoparticles of the invention and of the dispersions of the invention, far exceeds that of the prior art nanoparticles.

The nanoparticles and dispersions of the invention are employed by adding them to existing systems which are processed further to form coating materials, adhesives, plastics, etc. Adding even small amounts of the nanoparticles of the invention or dispersions of the invention produces an extraordinarily increased mechanical stability in conjunction with increased resistance to chemical influences on the part of the coating or moulding that ultimately results.

There is, surprisingly, no substantial influence on the processing properties of the coating materials and plastics, meaning that there is no need for the external parameters to be re-optimized in the case of these applications.

The nanoparticles of the invention and their dispersions are outstandingly suitable for use in coating materials, plastics, adhesives, sealants, etc.

EXAMPLES

Preparation Examples

Preparation Example 1

A 250-ml four-necked flask with heating, internal thermometer, stirrer mechanism, reflux condenser and inert-gas connection is charged with 100 g of Si—H-functional polysiloxane having the following average structure:

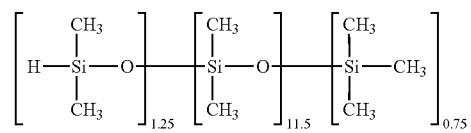

This silicone is easy to prepare by means of an equilibration reaction as described in Noll (Chemie und Technologie der Silicone, Wiley/VCH, Weinheim, 1984).

The silicone is heated to 70° C. under nitrogen, and 16.3 g of vinyltrimethoxysilane (e.g.: Geniosil XL10; Wacker Chemie GmbH) are added. Then 10 ppm of hexachloroplatinic acid are added. After the exothermic reaction has subsided the reaction mixture is stirred at 80° C. for an hour. Then reduced pressure is applied and approximately 2 g of unreacted vinyltrimethoxysilane and volatile constituents of the polysiloxane are separated off by distillation. The product is of low viscosity and possesses a slightly amberlike colouration.

Preparation Example 2

A kitchen mixer (Braun, model MX32) is charged with 100 g of nanoscale alumina (NanoDur, Nanophase Technology Corporation) and 4 g of modifying reagent from Preparation Example 1 are added. The mixture is then homogenized for 1 minute. The powder, coated with modifying reagent, is conditioned at 80° C. for one hour. The modified nanoparticles are in the form of a free-flowing powder with no lumps.

Preparation Example 3

40 g of the modified nanoparticles from Preparation Example 2 are incorporated by stirring into a solution of 56.8 g of methoxypropyl acetate and 3.2 g of wetting and dispersing assistant (BYK 9077, BYK-Chemie GmbH) and the mixture is then dispersed with ultrasound (Dr. Hielscher, UIP 1000, 500 W, 4 min). The resulting dispersion is of low viscosity and shows no tendency whatsoever towards gelling or sedimentation after 28 days' storage.

Preparation Example 4

A 250-ml four-necked flask is charged with 75 g of aqueous silica sol (Köstrosol 2040AS, Chemiewerk Bad Köstritz), and this charge is mixed with 75 g of 1-methoxy-2-propanol and heated to 60° C. 1.6 g of propyltrimethoxysilane (Dynasylan PTMO, Degussa AG) are added dropwise to the mixture, which is then stirred at 60° C. for two hours. Then 80 g of methoxypropylacetate are added and 110 g of solvent mixture are separated off under reduced pressure at 70° C. Subsequently 1.25 g of modifying reagent from Preparation Example 1 are added and the mixture is stirred at 75° C. for two hours. Following the addition of 3.75 g of wetting and dispersing assistant (Disperbyk 168, BYK-Chemie GmbH) the dispersion is homogenized and then a solids of 35% is set by removal of solvent mixture under reduced pressure at 75° C. The resulting dispersion exhibits a translucency which is typical of colloidal mixtures; it is of low viscosity and shows no tendency whatsoever towards gelling or sedimentation after 28 days' storage.

Preparation Example 5 (Comparative Example)

40 g of the nanoscale alumina powder (NanoDur, Nanophase Technology Corporation) are incorporated by stirring into a solution of 56.8 g of methoxypropyl acetate and 3.2 g of wetting and dispersing assistant (BYK 9077, BYK-Chemie GmbH) and the mixture is then dispersed with ultrasound (Dr. Hielscher, UIP 1000, 500 W, 4 min). The resulting dispersion is of low viscosity and shows no tendency whatsoever towards gelling or sedimentation after 28 days' storage.

Preparation Example 6 (Comparative Example)

A 250-ml four-necked flask is charged with 75 g of aqueous silica sol (Köstrosol 2040AS, Chemiewerk Bad Köstritz), and this charge is mixed with 75 g of 1-methoxy-2-propanol and heated to 60° C. 1.6 g of propyltrimethoxysilane (Dynasylan PTMO, Degussa AG) are added dropwise to the mixture, which is then stirred at 60° C. for two hours. Then 80 g of methoxypropylacetate are added and 110 g of solvent mixture are separated off under reduced pressure at 70° C. Following the addition of 3.75 g of wetting and dispersing assistant (Disperbyk 168, BYK-Chemie GmbH) the dispersion is homogenized and then a solid of 35% is set by removal of solvent mixture under reduced pressure at 75° C. The resulting dispersion exhibits a translucency which is typical of colloidal mixtures; it is of low viscosity and shows no tendency whatsoever towards gelling after 28 days' storage.

Preparation Example 7

A 250-ml four-necked flask with stirrer, internal thermometer, condenser and inert-gas inlet is charged with 53.3 g of Silaplane FM 0411 (Chisso Corporation) and this initial charge is mixed with 26.6 g of caprolactone. The mixture is heated to 100° C. under nitrogen as inert gas. At that temperature 0.004 g of dibutyltin dilaurate is added and heating is continued to 180° C. After four hours at this temperature the reaction mixture is cooled to 70° C. and mixed with 9.9 g of 3-isocyanatopropyltrimethoxysilane (SLM Geniosil GF 40, Wacker). After two hours' reaction time the product is cooled. The result is a waxlike, pale yellowish substance.

Preparation Examples 8/9

A 250-ml four-necked flask is charged with 75 g of aqueous silica sol (Köstrosol 2040AS, Chemiewerk Bad Köstritz), and this charge is mixed with 75 g of 1-methoxy-2-propanol and heated to 60° C. 1.6 g of propyltrimethoxysilane (Dynasylan PTMO, Degussa AG) are added dropwise to the mixture, which is then stirred at 60° C. for two hours. Then 80 g of methoxypropylacetate are added and 110 g of solvent mixture are separated off under reduced pressure at 70° C. Subsequently 1.20 g (Preparation Example 8) or 2.40 g (Preparation Example 9) of modifying reagent from Preparation Example 7 are added and the mixture is stirred at 75° C. for two hours. Following the addition of 3.75 g of wetting and dispersing assistant (Disperbyk 168, BYK-Chemie GmbH) the dispersion is homogenized and then a solids of 35% is set by removal of solvent mixture under reduced pressure at 75° C. The resulting dispersion exhibits a translucency which is typical of colloidal mixtures; it is of low viscosity and shows no tendency whatsoever towards gelling or sedimentation after 28 days' storage.

Preparation Example 10

A 100-ml four-necked flask with stirrer, internal thermometer, condenser and inert-gas inlet is charged with 40.0 g of Silaplane FM 0411 (Chisso Corporation) and this initial charge is mixed with 40.0 g of caprolactone. The mixture is heated to 70° C. under nitrogen as inert gas. At that temperature 0.004 g of dibutyltin dilaurate is added. The mixture is subsequently heated to 180° C. After a reaction time of four hours the mixture is cooled to 70° C. and then 9.3 g of 3-isocyanatopropyltrimethoxysilane (SLM Geniosil GF 40, Wacker) are added dropwise. After two hours' reaction time the product is cooled to room temperature. The result is a waxlike, pale yellowish substance.

Preparation Examples 11/12

A 250-ml four-necked flask is charged with 75 g of aqueous silica sol (Köstrosol 2040AS, Chemiewerk Bad Köstritz), and this charge is mixed with 75 g of 1-methoxy-2-propanol and heated to 60° C. 1.6 g of propyltrimethoxysilane (Dynasylan PTMO, Degussa AG) are added dropwise to the mixture, which is then stirred at 60° C. for two hours. Then 80 g of methoxypropylacetate are added and 110 g of solvent mixture are separated off under reduced pressure at 70° C.

Subsequently 1.20 g (Preparation Example 11) or 2.40 g (Preparation Example 12) of modifying reagent from Preparation Example 10 are added and the mixture is stirred at 75° C. for two hours. Following the addition of 3.75 g of wetting and dispersing assistant (Disperbyk 168, BYK-Chemie GmbH) the dispersion is homogenized and then a solids of 35% is set by removal of solvent mixture under reduced pressure at 75° C. The resulting dispersion exhibits a translucency which is typical of colloidal mixtures; it is of low viscosity and shows no tendency whatsoever towards gelling or sedimentation after 28 days' storage.

Preparation Example 13

A 250-ml four-necked flask is charged with 75 g of aqueous silica sol (Köstrosol 2040AS, Chemiewerk Bad Köstritz), and this charge is mixed with 100 g of diacetone alcohol and heated to 70° C. 2.25 g of a polyether-modified alkoxysilane (Silquest A-1230, OSi Specialities) are added dropwise to the mixture, which is then stirred at 70° C. for two hours. Then 30 g of solvent mixture are separated off under reduced pressure at 70° C. Subsequently 1.25 g of modifying reagent from Preparation Example 1 are added and the mixture is stirred at 70° C. for two hours. Following the addition of 6.0 g of wetting and dispersing assistant (Disperbyk 191, BYK-Chemie GmbH) the dispersion is adjusted to a solids of 35% (residue on ignition) which is set by removal of solvent mixture under reduced pressure at 75° C. The resulting dispersion exhibits a translucency which is typical of colloidal mixtures; it is of low viscosity and shows no tendency whatsoever towards gelling or sedimentation after 28 days' storage.

Application Examples

The application examples which follow illustrate the effectiveness of the nanoparticles of the invention and the dispersions in comparison to the corresponding non-inventive nanoparticles. All amounts relate to parts by weight.

Application Examples 1-5

2-Component Wood Varnish System

| Component | App. Ex. 1 | App. Ex. 2 | App. Ex. 3 | App. Ex. 4 | App. Ex. 5 |
| --- | --- | --- | --- | --- | --- |
| Desmophen 1300 BA | 33.75 | 33.75 | 33.75 | 33.75 | 33.75 |
| Methoxypropyl acetate | 41.25 | 37.50 | 37.50 | 30.54 | 30.54 |
| Dispersion from Prep. Ex. 3 | — | 3.75 | — | — | — |
| Dispersion from Prep. Ex. 5 (comp.) | — | — | 3.75 | — | — |
| Dispersion from Prep. Ex. 4 | — | — | — | 10.71 | — |
| Dispersion from Prep. Ex. 6 (comp.) | — | — | — | — | 10.71 |
| Desmodur HL 60 BA | 25.00 | 25.00 | 25.00 | 25.00 | 25.00 |

Desmophen 1300 BA (polyesterpolyol) Bayer AG
Desmodur HL 60 BA (polyisocyanate based on tolylene diisocyanate/hexamethylene diisocyanate) Bayer AG The Desmophen 1300 BA and methoxypropyl acetate components and, where appropriate, the corresponding dispersion were mixed thoroughly. Then the curing agent, Desmodur HL 60 BA, was added and stirred in. The resulting coating material was applied using a 100 μm spiral-wound coating bar to PMMA sheets (200×400 mm²) or glass plates (100*200 mm). The coating was cured at 40° C. for one hour. Following forced drying, the substrates were stored at room temperature for three days and then tested. The resulting film thickness was approximately 40 μm.

The scattered light fraction of the coatings was measured in transmission using an instrument from BYK-Gardner (hazegard plus). The scratch resistance was tested using a BYK-Gardner wet abrasion scrub tester in a method based on ASTM D 2486. The gloss of the coatings was measured in each case beforehand after the aforementioned scratch test, using a gloss meter (Micro-tri-gloss, BYK-Gardner).

| Example | Scattered light loss/ % haze | Gloss (20°) before scratch test/ gloss units | Gloss (20°) after scratch test/gloss units | Loss of gloss (20°) after scratch test |
| --- | --- | --- | --- | --- |
| App. Ex. 1 (blank sample) | 0.28 | 96 | 55 | 41 |
| App. Ex. 2 (inventive nanoparticles) | 1.81 | 101 | 99 | 2 |
| App. Ex. 3 (comparative sample) | 2.22 | 96 | 72 | 24 |
| App. Ex. 4 (inventive nanoparticles) | not determined | 91 | 90 | 1 |
| App. Ex. 5 (comparative sample) | not determined | 92 | 77 | 15 |

Application Examples 6-8

2-Component Automotive Refinish System

| | Application Example 6 | Application Example 7 | Application Example 8 |
| --- | --- | --- | --- |
| Component 1 | | | |
| Macrynal SM515/70BAC | 46.7 | 46.7 | 46.7 |
| Methoxypropyl acetate | 8.3 | 8.3 | 8.3 |
| Butyl glycol acetate | 1.3 | 1.3 | 1.3 |
| TinStab BL277 (1% strength solution in butyl acetate) | 0.2 | 0.2 | 0.2 |
| Butyl acetate | 10.1 | 10.1 | 10.1 |
| Dispersion from Prep. Ex. 4 | — | 3.3 | — |
| Dispersion from Prep. Ex. 6 (comp.) | — | — | 3.3 |
| Component 2 | | | |
| Desmodur N 3390 | 26.5 | 26.5 | 26.5 |
| Butyl acetate | 6.9 | 6.9 | 6.9 |

Macrynal SM 515/70BAC (hydroxy-functional polyacrylate) UCB
TinStab BL277 (dibutyltin dilaurate) Akcros Chemicals
Desmodur N 3390 (aliphatic polyisocyanate) Bayer AG The constituents of each of the components were mixed thoroughly. Immediately prior to coating the two components 1 and 2 were mixed. The coating system was applied by spraying to PMMA sheets (200×400 mm²). After a flash-off time of one hour at room temperature, forced drying at 60° C. was carried out over a period of 12 hours. The film thickness of the coating was approximately 45 μm.

The scratch resistance was tested using a BYK-Gardner wet abrasion scrub tester in a method based on ASTM D 2486. The resulting scratching was assessed visually on a scale from 1 (no scratching) to 6 (very severe scratching). The gloss and the haze were likewise assessed visually, and the results were assigned a value from 1 to 6 (1=very good, 6=highly deficient).

| Example | Degree of scratching | Gloss, haze |
|---|---|---|
| Application Example 6 (blank sample) | 6 | 1 |
| Application Example 7 (inventive nanoparticles) | 1 | 1 |
| Application Example 8 (comparative) | 5 | 1-2 |

Application Examples 9-11

UV Coating System

| Component | Application Example 9 | Application Example 10 | Application Example 11 |
|---|---|---|---|
| Roskydal UA VP LS 2308 | 60.0 | 60.0 | 60.0 |
| Hexanediol diacrylate | 35.0 | 35.0 | 35.0 |
| Darocur 1173 | 5.0 | 5.0 | 5.0 |
| Dispersion from Prep. Ex. 4 | — | 5.9 | — |
| Dispersion from Prep. Ex. 6 (comparative) | — | — | 5.9 |

Roskydal UA VP LS 2308 (aliphatic urethane acrylate) Bayer AG
Darocur 1173 (2-hydroxy-2-methyl-1-phenyl-propanone) Ciba Specialty Chemicals The components of the individual coating systems were mixed thoroughly and stored for 16 hours in a dark place at room temperature. The coating materials were applied using a 25 μm spiral-wound coating bar to Plexiglas sheets and then flashed off for 15 minutes. The coatings were cured in a UV unit. In total the coatings were treated twice at a belt speed of 5.0 m/min with an irradiation intensity of 120 W/cm.

The scratch resistance was tested using a BYK-Gardner wet abrasion scrub tester in a method based on ASTM D 2486. The resulting scratching was assessed visually on a scale from 1 (no scratching) to 6 (very severe scratching).

| Example | Degree of scratching |
|---|---|
| Application Example 9 (blank sample) | 5 |
| Application Example 10 (inventive nanoparticles) | 2 |
| Application Example 11 (comparative) | 4 |

Application Examples 12-15

2-Component Automotive Refinish System

| | App. Ex. 6 | App. Ex. 12 | App. Ex. 13 | App. Ex. 14 | App. Ex. 15 |
|---|---|---|---|---|---|
| Comp. 1 | | | | | |
| Macrynal SM515/70BAC | 46.7 | 46.7 | 46.7 | 46.7 | 46.7 |
| Methoxypropyl acetate | 8.3 | 8.3 | 8.3 | 8.3 | 8.3 |
| Butyl glycol acetate | 1.3 | 1.3 | 1.3 | 1.3 | 1.3 |
| TinStab BL277 (1% strength solution in butyl acetate) | 0.2 | 0.2 | 0.2 | 0.2 | 0.2 |
| Butyl acetate | 10.1 | 10.1 | 10.1 | 10.1 | 10.1 |
| Dispersion from Prep. Ex. 8 | — | 3.3 | — | — | — |
| Dispersion from Prep. Ex. 9 | — | — | 3.3 | — | — |
| Dispersion from Prep. Ex. 11 | — | — | — | 3.3 | — |
| Dispersion from Prep. Ex. 12 | — | — | — | — | 3.3 |
| Comp. 2 | | | | | |
| Desmodur N 3390 | 26.5 | 26.5 | 26.5 | 26.5 | 26.5 |
| Butyl acetate | 6.9 | 6.9 | 6.9 | 6.9 | 6.9 |

Macrynal SM 515/70BAC (hydroxy-functional polyacrylate) UCB
TinStab BL277 (dibutyltin dilaurate) Akcros Chemicals
Desmodur N 3390 (aliphatic polyisocyanate) Bayer AG The constituents of each of the components were mixed thoroughly. Immediately prior to coating the two components 1 and 2 were mixed. The coating system was applied by spraying to PMMA sheets (200×400 mm). After a flash-off time of one hour at room temperature, forced drying at 60° C. was carried out over a period of 12 hours. The film thickness of the coating was approximately 45 μm.

The scratch resistance was tested using a BYK-Gardner wet abrasion scrub tester in a method based on ASTM D 2486. The resulting scratching was assessed visually on a scale from 1 (no scratching) to 6 (very severe scratching). The gloss and the haze were likewise assessed visually, and the results were assigned a value from 1 to 6 (1=very good, 6=highly deficient).

| Example | Degree of scratching |
|---|---|
| Application Example 6 (blank sample) | 6 |
| Application Example 12 (inventive nanoparticles) | 3 |
| Application Example 13 (inventive nanoparticles) | 2 |
| Application Example 14 (inventive nanoparticles) | 2 |
| Application Example 15 (inventive nanoparticles) | 1 |

Application Examples 16/17

Aqueous Wood Varnish

| Ingredient | Application Example 16 | Application Example 17 |
|---|---|---|
| NeoPac E 106 | 46.40 | 46.40 |
| BYK-028 | 0.20 | 0.20 |

| Ingredient | Application Example 16 | Application Example 17 |
|---|---|---|
| Butyl glycol | 2.20 | 2.20 |
| Propylene glycol | 2.20 | 2.20 |
| Water | 6.00 | 6.00 |
| Coatex BR 125 P (10% in water) | 1.80 | 1.80 |
| BYK-341 | 0.20 | 0.20 |
| BYK-346 | 0.20 | 0.20 |
| BYK-028 | 0.80 | 0.80 |
| NeoPac E 106 | 40.00 | 40.00 |
| Dispersion from Preparation Example 13 | — | — |

NeoPac E 106 (aromatic urethane acrylic copolymer dispersion, 33% in water) DSM NeoResins, NL
BYK-028 (defoamer) BYK-Chemie GmbH, D
Coatex BR 125 P (polyurethane thickener, 10% in water) Coatex SA, F
BYK-341 (surface additive) BYK-Chemie GmbH, D
BYK-346 (surface additive) BYK-Chemie GmbH, D The components of the individual coating systems were mixed thoroughly with one another in the order stated. After standing at room temperature for two hours, the varnishes were knife-coated in a film thickness of 150 μm onto plastic substrates measuring 200×400 mm. The coatings were cured by storage of the respective sheets under ambient conditions for 16 h and then by storage of the at 60° C. in a forced-air oven for two hours.

The scratch resistance of the sheets was determined after conditioning at room temperature for 48 h.

The scratch resistance was tested using a BYK-Gardner wet abrasion scrub tester in a method based on ASTM D 2486. The scratching produced was assessed after 100 or 500 back-and-forth strokes, visually, on a scale from 1 (no scratching) to 6 (very severe scratching).

| Example | Degree of scratching after 100 back-and-forth strokes | Degree of scratching after 500 back-and-forth strokes |
|---|---|---|
| Application Example 16 (blank sample) | 5 | 5 |
| Application Example 17 (inventive nanoparticles) | 2 | 3 |

The invention claimed is:

1. Surface-modified nanoparticles comprising metal or semimetal oxides or hydroxides having a covalently bonded modifier on their surfaces, wherein the modifier is a polysiloxane of the following general empirical formula:

$$(R^1{}_xR^2{}_{3-x}SiR^3)_yR^5$$

in which
x=0-2,
y=1-10,
R$^1$=monovalent organic radical having 1-18 carbon atoms,
R$^2$=OH group or hydrolysable group consisting of:
  linear or branched or cyclic alkoxy group having 1-6 carbon atoms,
  a halogen atom, or
  a carboxylic acid radical having 1-4 carbon atoms,
R$^3$=a divalent organic radical consisting of:
  linear or branched alkylene radical having 1-8 carbon atoms,
  alkylene ether,
  alkylene thioether, or
  alkylene polyether, based on ethylene oxide, propylene oxide or butylene oxide or mixtures thereof,
  arylene polyether,
  alkylene polyester, or
  an organic aliphatic or aromatic or araliphatic group which in addition to ester and/or ether groups also contain urethane and/or urea groups,
R$^5$=polyvalent organic radical consisting of:
  polydialkylsiloxane having a number-average molecular weight of 300-5000 daltons, the alkyl substituents on the silicon atom having 1-8 carbon atoms.

2. Nanoparticles according to claim 1, wherein the modifier is a polysiloxane of the general empirical formula $$R^1{}_xR^2{}_{3-x}Si-R^3-R^4$$

in which R$^4$ is a monovalent organic radical consisting of a polydialkylsiloxane having a number-average molecular weight of 300-5000 daltons, the alkyl substituents on the silicon atom having 1-8 carbon atoms.

3. Nanoparticles according to claim 1, wherein the polydialkylsiloxane is polydimethylsiloxane.

4. Nanoparticles according to claim 1, wherein the nanoparticles are composed of oxides or oxide hydroxides of aluminium, silicon, zinc or titanium.

5. Nanoparticles according to claim 1, wherein that the nanoparticle particle size as measured by transmission electron microscopy is 2-200 nm.

6. Nanoparticles according to claim 1, wherein the fraction of the modifier is 0.1% to 15% by weight, based on the total weight of the surface-modified nanoparticles.

7. A process for preparing nanoparticles according to claim 1, comprising reacting starting nanoparticles composed of metal or semimetal oxides or hydroxides with a modifier, to form covalent bonds between the starting nanoparticles and the modifier, wherein the modifier is a polysiloxane of the following general empirical formula:

$$(R^1{}_xR^2{}_{3-x}SiR^3)_yR^5$$

in which
x=0-2,
y=1-10,
R$^1$=monovalent organic radical having 1-18 carbon atoms,
R$^2$=OH group or hydrolysable group consisting of:
  linear or branched or cyclic alkoxy group having 1-6 carbon atoms,
  a halogen atom, or
  a carboxylic acid radical having 14 carbon atoms,
R$^3$=a divalent organic radical consisting of:
  linear or branched alkylene radical having 1-8 carbon atoms,
  alkylene ether,
  alkylene thioether, or
  alkylene polyether, based on ethylene oxide, propylene oxide or butylene oxide or mixtures thereof
  arylene polyether,
  alkylene polyester, or
  an organic aliphatic or aromatic or araliphatic group which in addition to ester and/or ether groups also contain urethane and/or urea groups, and
R$^5$=polyvalent organic radical consisting of:
  polydialkylsiloxane having a number-average molecular weight of 300-5000 daltons, the alkyl substituents on the silicon atom having 1-8 carbon atoms.

8. A process according to claim 7, wherein the nanoparticles are reacted with a polysiloxane of the general empirical formula $$R^1{}_xR^2{}_{3-x}Si-R^3-R^4$$

in which R$^4$ is a monovalent organic radical consisting of a polydialkylsiloxane having a number-average molecular weight of 300-5000 daltons, the alkyl substituents on the silicon atom having 1-8 carbon atoms.

9. A process according to claim 7, wherein the unmodified nanoparticles are reacted with an amount of modifier such that the fraction of the modifier is 0.1% to 15% by weight, based on the total weight of the surface-modified nanoparticles.

10. A coating material, plastic, foam or nail varnish containing the nanoparticles of claim 1 as a filler.

11. A dispersion of a carrier medium and nanoparticles according to claim 1.

* * * * *

UNITED STATES PATENT AND TRADEMARK OFFICE
CERTIFICATE OF CORRECTION

PATENT NO. : 7,641,972 B2
APPLICATION NO. : 11/354338
DATED : January 5, 2010
INVENTOR(S) : Nolte et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 997 days.

Signed and Sealed this

Twenty-first Day of December, 2010

David J. Kappos
*Director of the United States Patent and Trademark Office*